US011229051B2

(12) United States Patent
Liu et al.

(10) Patent No.: US 11,229,051 B2
(45) Date of Patent: Jan. 18, 2022

(54) METHOD AND APPARATUS FOR CARRIER SENSING

(71) Applicant: Telefonaktiebolaget LM Ericsson (publ), Stockholm (SE)

(72) Inventors: Jinhua Liu, Beijing (CN); Gen Li, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 476 days.

(21) Appl. No.: 16/332,132

(22) PCT Filed: Sep. 12, 2018

(86) PCT No.: PCT/CN2018/105232
§ 371 (c)(1),
(2) Date: Mar. 11, 2019

(87) PCT Pub. No.: WO2019/052468
PCT Pub. Date: Mar. 21, 2019

(65) Prior Publication Data
US 2021/0329694 A1 Oct. 21, 2021

(30) Foreign Application Priority Data
Sep. 14, 2017 (WO) ............... PCT/CN2017101701

(51) Int. Cl.
*H04W 16/14* (2009.01)
*H04W 74/08* (2009.01)
(52) U.S. Cl.
CPC ....... *H04W 74/0808* (2013.01); *H04W 16/14* (2013.01)

(58) Field of Classification Search
CPC ............. H04W 74/0808; H04W 16/14; H04W 74/0816; H04W 74/0825; H04W 76/10; H04W 76/00
(Continued)

(56) References Cited

U.S. PATENT DOCUMENTS 9,693,264 B2 * 6/2017 Kim ...................... H04W 28/26
2016/0286545 A1 9/2016 Luo et al.
(Continued)

FOREIGN PATENT DOCUMENTS

WO WO 2016/185275 A1 11/2016
WO WO 2017/020200 A1 2/2017

OTHER PUBLICATIONS

International Search Report and Written Opinion of the International Searching Authority, PCT/CN2018/105232, dated Nov. 1, 2018, 9 pages.
(Continued)

Primary Examiner — Danh C Le
(74) Attorney, Agent, or Firm — Sage Patent Group

(57) ABSTRACT

Methods and devices for carrier sensing are disclosed. In an embodiment, a method for carrier sensing implemented at a terminal device comprises determining at least one transmission resource schedulable for uplink data transmission on a channel operating in an unlicensed spectrum, determining at least one carrier sensing process respectively for the at least one transmission resource, and performing the carrier sensing on the channel according to the determined at least one carrier sensing process before reception of downlink scheduling information for the uplink data transmission.

15 Claims, 11 Drawing Sheets

(58) Field of Classification Search
USPC ............ 370/329, 310.2, 350; 455/418, 550.1
See application file for complete search history.

(56) References Cited

U.S. PATENT DOCUMENTS

| | | | |
|---|---|---|---|
| 2017/0013479 A1 | 1/2017 | Sun et al. | |
| 2017/0118765 A1* | 4/2017 | Kalhan | H04W 72/1284 |
| 2018/0152954 A1* | 5/2018 | Golitschek Edler Von Elbwart | H04L 5/0092 |
| 2018/0255577 A1* | 9/2018 | Lee | H04W 72/0453 |
| 2019/0124688 A1* | 4/2019 | Golitschek Edler Von Elbwart | H04L 1/1835 |
| 2019/0173611 A1* | 6/2019 | Liu | H04W 4/70 |
| 2019/0200379 A1* | 6/2019 | Wang | H04W 74/0808 |
| 2019/0342037 A1* | 11/2019 | Karaki | H04W 74/0808 |
| 2020/0022174 A1* | 1/2020 | Karaki | H04L 1/1812 |
| 2020/0236555 A1* | 7/2020 | Tomeba | H04W 74/0808 |
| 2020/0280859 A1* | 9/2020 | Kim | H04W 72/1284 |
| 2020/0382967 A1* | 12/2020 | Yamada | H04W 16/28 |

OTHER PUBLICATIONS

Intel Corporation, PRACH Design for eLAA, 3GPP TSG RAN WG1 Meeting #84bis, R1-162358, Busan, Korea, Apr. 11-15, 2016, 5 Pages.
Zte, UL framework for LAA 3GPP TSG RAN WG1 Meeting #83, R1-156994, Anaheim USA, Nov. 15-22, 2015, 6 Pages.
Extended European Search for application EP 18852742.8, dated Jun. 19, 2019, 8 pages.

* cited by examiner

METHOD AND APPARATUS FOR CARRIER SENSING

CROSS REFERENCE TO RELATED APPLICATIONS

This application is a 35 U.S.C. § 371 national stage application of PCT International Application No. PCT/CN2018/105232 filed on Sep. 12, 2018, which in turn claims priority to PCT Patent Application No. PCT/CN2017/101701, filed on Sep. 14, 2017, the disclosures and content of which are incorporated by reference herein in their entirety.

TECHNICAL FIELD

The non-limiting and exemplary embodiments of the present disclosure relates generally to wireless access technology, and in particular, to methods, devices and computer program for carrier sensing.

BACKGROUND

This section introduces aspects that may facilitate a better understanding of the disclosure. Accordingly, the statements of this section are to be read in this light and are not to be understood as admissions about what is in the prior art or what is not in the prior art.

Carrier sensing, also referred to as Listen Before Talk (LBT), is a key technology for channel access, particularly for a channel operating on shared unlicensed spectrums. Before accessing a channel (or carrier), a wireless communication device shall firstly determine the channel is available via sensing the channel. If the channel is determined not available, the wireless communication device shall not access the channel. The LBT schemes for Wi-Fi system and LTE (Long Term Evolution) system will be briefly described below as references.

I. LBT Scheme for Wi-Fi Systems

In typical deployments of a Wireless Local Area Network (WLAN), carrier sense multiple access with collision avoidance (CSMA/CA) is used for medium access. This means that a channel is sensed to perform a clear channel assessment (CCA), and a transmission is initiated only if the channel is declared as Idle. In case the channel is declared as Busy, the transmission is essentially deferred until the channel is deemed to be Idle. When the ranges of several Access Points (APs) using the same frequency overlap, it means that all transmissions related to one AP might be deferred in case a transmission on the same frequency to or from another AP which is within the range can be detected. Effectively, it means that if several APs are within the range, they will have to share the channel in time, and the throughput for the individual AP may be severely degraded compared to their isolated deployments. A general illustration of the LBT mechanism is shown in FIG. 1.

After a Wi-Fi station A transmits a data frame to a station B, the station B shall transmit Acknowledgement (ACK) frame back to the station A with a delay of 16 μs (referred to as Short Inter-frame Spacing (SIFS)). Such ACK frame is transmitted by the station B without performing the LBT operation. To prevent another station interfering with such ACK frame transmission, a station shall defer for a duration of 34 μs (referred to as Distributed Coordination Function Inter-frame Spacing (DIFS)) after the channel is observed to be occupied before a subsequent attempt to assess again whether or not the channel is occupied.

Therefore, a station that wishes to transmit first performs the CCA by sensing the medium for a fixed duration DIFS. If the medium is found to be idle, the station assumes that it may take ownership of the medium and begin a frame exchange sequence. If the medium is busy, the station waits for the medium to go idle, defers for DIFS, and waits for a further random back off period.

To further prevent a station from occupying the channel continuously and thereby prevent other stations from accessing the channel, it is required for a station wishing to transmit again after a transmission is completed to perform a random back off.

The Point Coordination Function (PCF) Inter-frame Spacing (PIFS) is used to gain priority access to the medium, and is shorter than the DIFS duration. Among other cases, it can be used by stations operating under PCF to transmit Beacon Frames with priority. At the nominal beginning of each Contention-Free Period (CFP), Point Coordinator (PC) shall sense the medium. When the medium is determined to be idle for one PIFS period (generally 25 μs), the PC shall transmit a Beacon Frame containing the Contention Free (CF) Parameter Set element and a delivery traffic indication message element.

The widely used Wi-Fi systems based on IEEE 802.11g/n/ac standards operate in low frequencies (sub 6 GHz frequencies), and listen and talk operations, i.e., sensing, reception and transmission are omni-directional. The key objective of LBT scheme is to avoid interference between simultaneous data transmission. Practical application results show that this works well in this case.

II. LBT Scheme for Licensed Assisted Access (LAA) Systems

An evolved NodeB (eNB) may conduct a transmission including Physical Downlink Shared Channel (PDSCH) on a channel on which LAA Scell(s) transmission(s) are performed, after first sensing the channel to be idle during the slot durations of a defer duration $T_d$, and after the counter N is zero in Step 4 below. The counter N is adjusted by sensing the channel for additional slot duration(s) according to the steps below:

Step 1: Set $N=N_{init}$, where $N_{init}$ is a random number uniformly distributed between 0 and $CW_p$, and go to Step 4;

Step 2: If N>0 and the eNB chooses to decrement the counter, set N=N−1;

Step 3: Sense the channel for additional slot duration, and if the additional slot duration is idle, go to Step 4, else go to Step 5;

Step 4: If N=0, stop, else go to Step 2;

Step 5: Sense the channel during the slot durations of an additional defer duration $T_d$;

Step 6: If the channel is sensed to be idle during the slot durations of the additional defer duration $T_d$, go to Step 2, else go to Step 5.

If the eNB has not finished a transmission including PDSCH on a channel on which LAA Scell(s) transmission(s) are performed after Step 4 in the procedure above, the eNB may transmit a transmission including PDSCH on the channel, after sensing the channel to be idle at least in the slot durations of an additional defer duration.

The defer duration $T_d$ consists of duration 16 μs≤$T_f$≤16 μs+$T_s$ immediately followed by $m_p$ consecutive slot durations where each slot duration is 9 μs≤$T_{sl}$≤9 μs+$T_s$, and $T_f$ includes an idle slot duration $T_{sl}$ at start of $T_f$.

A slot duration $T_{sl}$ is considered to be idle if the eNB senses the channel during the slot duration, and the power detected by the eNB for at least 4 μs within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window (which is also referred to as "backoff window").

$CW_{min,p}$ and $CW_{max,p}$ are chosen before Step 1 of the procedure above.

$m_p$, $CW_{min,p}$, and $CW_{max,p}$ are based on channel access priority class associated with the eNB transmission, as shown in Table 1.

If the eNB transmits discovery signal transmission(s) not including PDSCH when N>0 in the procedure above, the eNB shall not decrement N during the slot duration(s) overlapping with discovery signal transmission.

The eNB shall not continuously transmit on a channel on which the LAA Scell(s) transmission(s) are performed, for a period exceeding $T_{mcot,p}$ as given in Table 1. The value of p is determined by the traffic priority class. The high traffic priority class corresponds to a small p, which means short LBT duration is applied.

For p=3 and p=4 (e.g. video traffic, web browsing or FTP), if the absence of any other technology sharing the carrier can be guaranteed on a long term basis (e.g. by level of regulation), $T_{mcot,p}$=10 ms, otherwise, $T_{mcot,p}$=8 ms.

TABLE 1

Channel Access Priority Class

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

For category-4 LBT scheme, user equipment (UE) shall first sense the channel for 34 μs before starting channel sensing according to the generated random backoff counter. Assuming $CW_{min,p}$ is applied, the range of total backoff window size for category-4 LBT scheme is shown in Table 2.

TABLE 2

Backoff Window Size for Carrier Sensing with $CW_{min, p}$

| Channel Access Priority Class (p) | $m_p$ | $CW_p$ | Minimum Backoff Window Size for Channel Sensing (μs) | Maximum Backoff Window Size for Channel Sensing(μs) | Mean Backoff Window Size for Channel Sensing(μs) |
|---|---|---|---|---|---|
| 1 | 1 | 3 | 43 | 55 | 49 |
| 2 | 1 | 7 | 43 | 97 | 70 |
| 3 | 3 | 15 | 43 | 169 | 111 |
| 4 | 7 | 15 | 43 | 169 | 111 |

The total backoff window size is even longer with other candidate values of $CW_p$.

For transmission in the same transmission opportunity, the UE shall perform a short LBT scheme. As used therein, the term "short LBT scheme" refers to the LBT scheme with a carrier sensing duration of 25 μs. The carrier sensing duration may be represented by the backoff window size.

III. LBT Scheme for UL Carrier Sensing in LTE System

In the LTE system, the processing time is long for both downlink (DL) carrier sensing and UL carrier sensing. For UL carrier sensing, there is at least 3 ms between UL grant receiving and UL data transmission. FIG. 2 shows an example for uplink data transmission in unlicensed carrier for LAA-LTE system. There is around 3 ms duration between the UL grant receiving and the UL data transmission. Referring to the backoff window size generated according to the parameters in Table 1, this duration is long enough for the UE to perform LBT scheme for the scheduled UL data transmission after receiving the UL grant. Hence the UE can start the LBT scheme after the UL grant is received.

SUMMARY

Various embodiments of the present disclosure mainly aim at providing methods, devices and computer programs for carrier sensing. Other features and advantages of embodiments of the present disclosure will also be understood from the following description of specific embodiments when read in conjunction with the accompanying drawings, which illustrate, by way of example, the principles of embodiments of the present disclosure.

According to a first aspect of the disclosure, there is provided a method for carrier sensing implemented at a terminal device. The method comprises determining at least one transmission resource schedulable for uplink data transmission on a channel operating in an unlicensed spectrum and determining at least one carrier sensing process respectively for the at least one transmission resource. The method further comprises performing the carrier sensing on the channel according to the determined at least one carrier sensing process before reception of downlink scheduling information for the uplink data transmission.

In some embodiments, the at least one transmission resource may be determined based on a buffer status indicating there is buffered data for the uplink data transmission.

In some embodiments, determining the at least one transmission resource may comprise determining a first transmission resource for scheduling request; determining an earliest transmission resource for receiving the downlink scheduling information relative to the first transmission resource, and determining an earliest transmission resource for the uplink data transmission relative to the earliest transmission resource for receiving the downlink scheduling information.

In some embodiments, the at least one transmission resource may be determined with respect to an end of the last uplink data transmission.

In an embodiment, determining the at least one transmission resource may comprise determining a delay duration between different uplink data transmissions; and determining an earliest transmission resource for the uplink data transmission based on the end of the last uplink data transmission and the delay duration.

In some embodiments, the at least one transmission resource may be determined based on a maximum channel occupying time.

In some embodiments, determining at least one carrier sensing process may comprise generating a backoff value for each of the at least one carrier sensing process; and determining a start time of the at least one carrier process based on the corresponding transmission resource and the backoff value.

In some embodiments, performing the carrier sensing may comprise performing the carrier sensing on the channel from the respective start time of the at least one carrier sensing process; detecting the reception of the downlink scheduling information; performing, in response to the channel being sensed to be available, the uplink data transmission; and stopping the currently ongoing carrier sensing.

In some embodiments, the carrier sensing may be based on a category-4 LBT scheme or a short LBT scheme.

In some embodiments, performing the carrier sensing may further comprise determining, upon the reception of the downlink scheduling information, remaining time duration for the carrier sensing; and performing, in response to the remaining time duration being longer than a backoff value for a short LBT scheme, the carrier sensing based on the short LBT scheme.

According to a second aspect of the disclosure, there is provided a method for carrier sensing implemented at a network device. The method comprises determining at least one transmission resource schedulable for downlink transmission on a channel operating in an unlicensed spectrum and determining at least one carrier sensing process respectively for the at least one transmission resource. The method further comprises performing the carrier sensing on the channel according to the determined at least one carrier sensing process before reception of uplink information requiring the downlink transmission.

In some embodiments, the at least one transmission resource may be determined relative to a transmission resource for scheduling request.

In some embodiments, the at least one transmission resource may be determined relative to a transmission resource for uplink control information for downlink data retransmission.

In some embodiments, determining at least one carrier sensing process may comprise generating, for the at least one carrier sensing process, a respective backoff value, and determining a start time of the at least one carrier sensing process based on the corresponding transmission resource and the backoff value.

In some embodiments, performing the carrier sensing may comprise performing the carrier sensing on the channel from the respective start time of the at least one carrier sensing process; detecting the reception of the uplink information requiring the downlink transmission; performing, in response to the channel being sensed to be available, the downlink transmission; and stopping the currently ongoing carrier sensing.

In some embodiments, performing the carrier sensing may further comprise determining, upon the reception of the uplink information requiring the downlink transmission, remaining time duration for the carrier sensing; and performing, in response to the remaining time duration being longer than a backoff value for a short listen before talk scheme, the carrier sensing based on the short listen before talk scheme.

According to a third aspect of the disclosure, there is provided a terminal device. The terminal device comprises a processor and a memory. The memory may contain instructions executable by the processor, whereby the terminal device is operative to determine at least one transmission resource schedulable for uplink data transmission on a channel operating in an unlicensed spectrum, determine at least one carrier sensing process respectively for the at least one transmission resource, and perform the carrier sensing on the channel according to the determined at least one carrier sensing process before reception of downlink scheduling information for the uplink data transmission.

According to a fourth aspect of the disclosure, there is provided a network device. The network device comprises a processor and a memory. The memory may contain instructions executable by the processor, whereby the apparatus is operative to determine at least one transmission resource schedulable for downlink transmission on a channel operating in an unlicensed spectrum, determine at least one carrier sensing process respectively for the at least one transmission resource, and perform the carrier sensing on the channel according to the determined at least one carrier sensing process before reception of uplink information requiring the downlink transmission.

According to a fifth aspect of the disclosure, there is provided a computer readable storage medium having a computer program stored thereon. The computer program is executable by a device to cause the device to carry out the method for carrier sensing according to the first aspect of the disclosure.

According to a sixth aspect of the disclosure, there is provided a computer readable storage medium having a computer program stored thereon. The computer program is executable by a device to cause the device to carry out the method for carrier sensing according to the second aspect of the disclosure.

According to the various aspects and embodiments as mentioned above, the carrier sensing on the channel can be performed in advance before receiving any control information related to uplink or downlink transmission, thereby improving efficiency of channel utilization.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
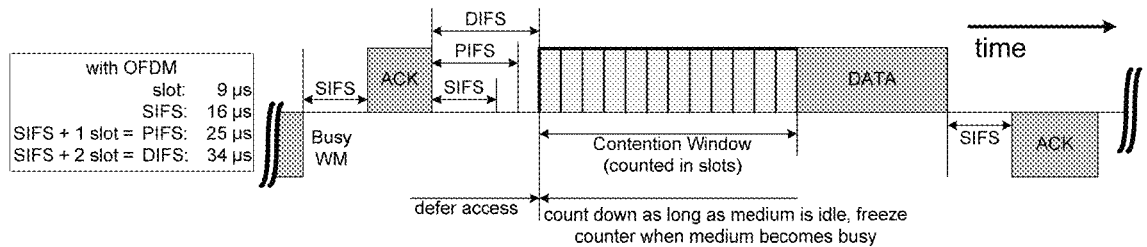
FIG. 1 illustrates an LBT scheme for Wi-Fi system.
Figure 2:
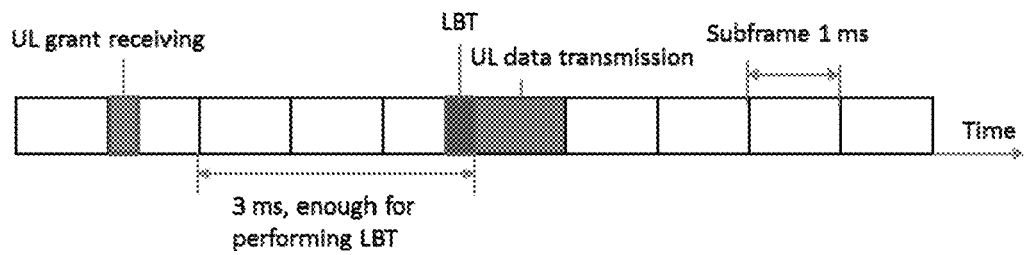
FIG. 2 illustrates an LBT scheme for UL data transmission in LAA-LTE system.

Some exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "terminal device", "user equipment" and "UE" may be used interchangeably. Similarly, the term "network device" may represent a base station (BS), a node B (NodeB or NB), an evolved NodeB (eNodeB or eNB), a Remote Radio Unit (RRU), a radio head (RH), a remote radio head (RRH), a relay node (RN), a low power node (LPN) such as a femto, a pico, an access point (AP) and so forth.

For illustrative purposes, several embodiments of the present disclosure will be described in the context of a NR system. Those skilled in the art will appreciate, however, that the concept and principle of the several embodiments of the present disclosure may be more generally applicable to other wireless networks, for example a 3GPP LTE network.

Unlicensed operation will be one key part for the NR system as well. In early phase, the unlicensed spectrum in 5 GHz is the focus in specification and system design. For the unlicensed operation, the NR system will be operated in an unlicensed spectrum (e.g. 2.4 GHz and 5 GHz) which is shared by various wireless communication systems such as LAA-LTE system. Harmonious spectrum sharing scheme with acceptable complexity for both standardization and system design shall be preferred to ensure that the different wireless communication systems can operate well. For the different wireless communication systems operated in the shared unlicensed spectrum, the carrier sensing scheme would be used for channel access. That is, before accessing a channel (or carrier) of an unlicensed frequency by a wireless communication system, the wireless communication system shall firstly determine the channel is available via sensing the channel. If the channel is determined not available, the wireless communication system shall not access the channel.

Figure 3:
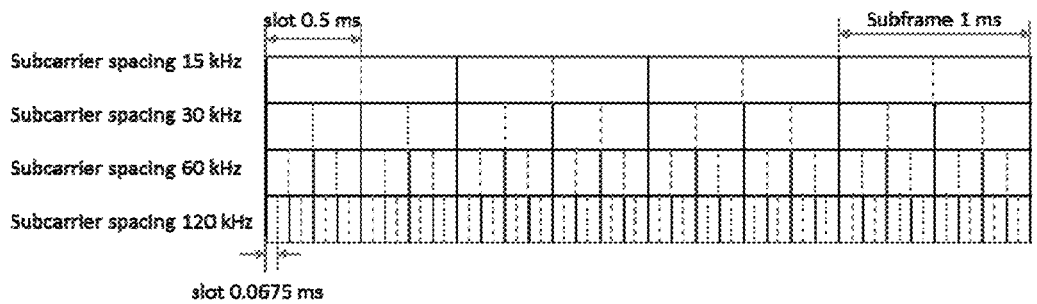
FIG. 3 illustrates an exemplary subframe structure for different numerologies in NR (New Radio) system.

As described above, in LTE, the processing time for LBT is long, but the timing for the NR system will be very tight compared to the LTE system even when the same subcarrier spacing is used as the LTE system. For unlicensed operation, the subcarrier spacing could be larger than 15 kHz for the NR system. Possible it could be one or more of 30 kHz, 60 kHz or 120 kHz. Correspondingly, the slot lengths (½ subframe) are 250 µs, 125 µs and 67.5 µs, respectively. FIG. 3 shows an example of a subframe structure for different numerologies in NR system. For the subcarrier spacing of 120 kHz, the slot with 7 OFDM symbols is around 67.5 µs.

In 5 GHz frequency bands, the subcarrier spacing could be 30 kHz or 60 kHz, and accordingly a length of the OFDM symbol is around 35.7 μs or 17.8 μs.

Currently LBT scheme for NR is not investigated yet in 3GPP. The current LBT for WiFi and LAA-LTE are defined according to the spectrum regulation policies. It is expected that the unlicensed operation of the NR system shall be subject to the similar rule for the LBT system in order to align the regulatory policy and coexist with WiFi and LAA-LTE systems.

For the uplink data transmission, if the UE starts the carrier sensing (in which the backoff window size is 43~169 μs) for subband A (or carrier 1) after receiving a UL grant in subband B (or carrier 2) and the UE is required to start the data transmission in the next slot or in the same slot in which the UL grant is received, the time required for carrier sensing might be longer than the duration between the end of the UL grant decoding and the start of the UL data transmission. This may result in that the UE cannot transmit data in the next slot or the same slot due to no enough time for the LBT scheme. The subbands A and B may be 20 MHz bandwidth belonging to one unlicensed carrier for NR.

Figure 4:
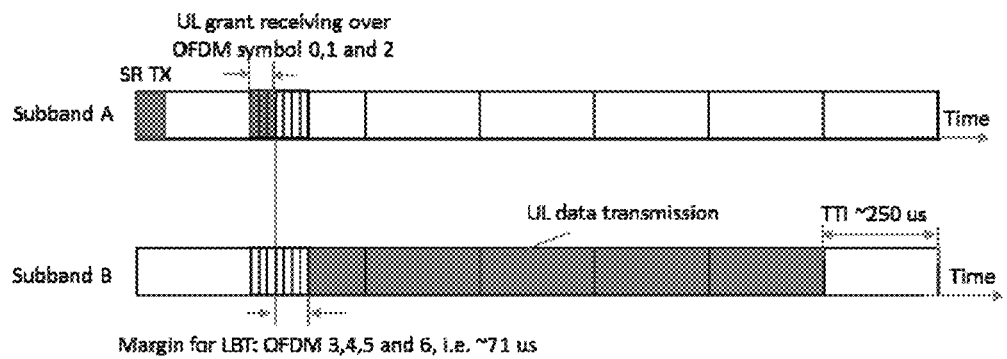
FIG. 4 is a diagram illustrating an example of timing for UL scheduling in NR system.
Figure 5:
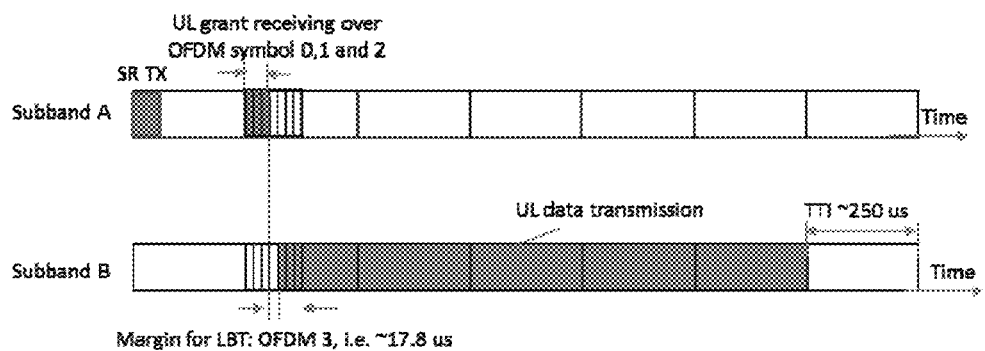
FIG. 5 is a diagram illustrating another example of timing for UL scheduling in NR system.

FIGS. 4 and 5 show two examples of timing for UL scheduling in NR system in which the subcarrier spacing is 60 kHz. FIG. 4 shows the example for cross slot scheduling (typical), and FIG. 5 shows the example for in slot scheduling. The UE needs to perform the category-4 LBT scheme for uplink data transmission in subband B. However, it is concluded that the UE does not have enough time to perform the carrier sensing in subband B when the UL grant is received in subband A.

Referring to FIG. 4, there is a margin of averagely 71 μs for the LBT scheme between the UL grant receiving and UL data transmission in the next slot. For p=3 or 4, the probability is larger than 70% that the UE has not enough time to finish the category-4 LBT scheme considering the processing delay of the UL grant.

Referring to FIG. 5, the UE shall perform a short LBT scheme (in which the backoff window size is 25 μs) as the interval between the end of the UL grant receiving and the start of the UL data transmission is larger than 16 μs. However, the margin (1 OFDM symbol=17.8 μs) is smaller than the backoff window size of the short LBT scheme, the UE has not enough time to finish the LBT scheme as well.

Figure 6:
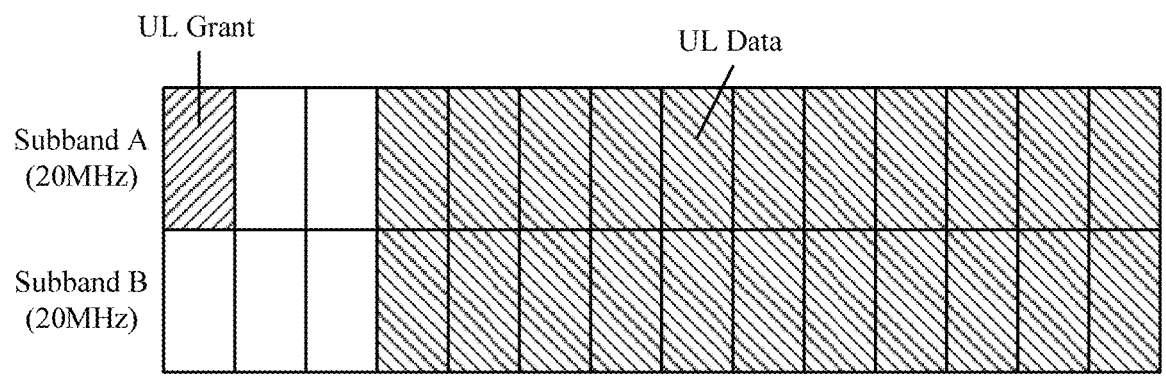
FIG. 6 illustrates an example for UL scheduling in an unlicensed carrier with 40 MHz bandwidth in NR system.

But this problem may not happen for the LAA-LTE system due to the following two reasons: a) the interval (i.e. at least 3 ms) between the UL grant receiving and the UL data transmission is quite enough for the UE to perform the category-4 LBT scheme; b) the UL grant receiving and UL data transmission are in the same 20 MHz channel so that a short CCA is needed for the UL data transmission. However, in the unlicensed operation of the NR system, this problem becomes a typical case especially when it is operating in wider bandwidth case (e.g. 40 MHz), where the UL grant is only located in part of the whole band or licensed carrier, as shown in FIG. 6.

Figure 7:
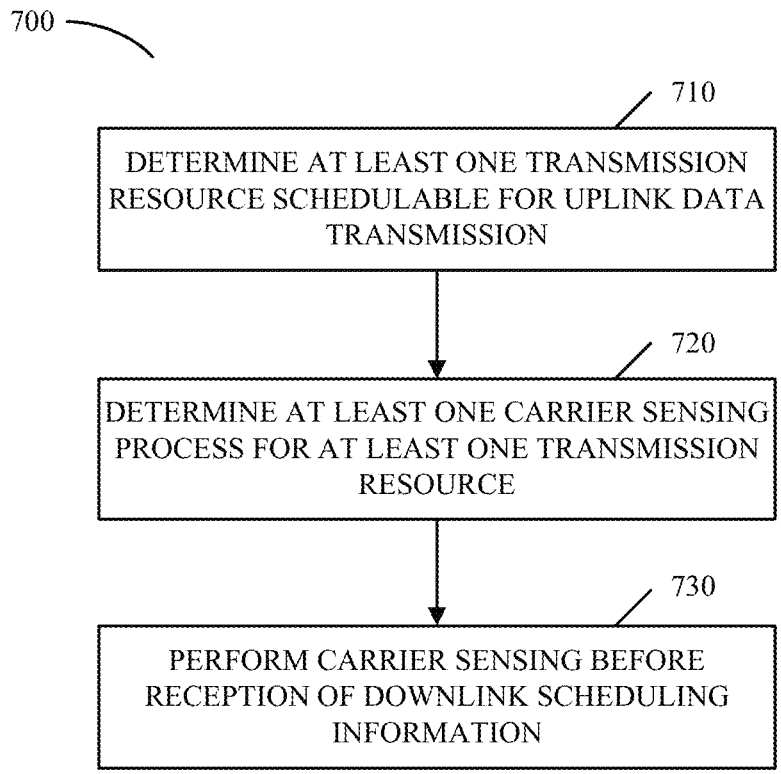
FIG. 7 is a flowchart illustrating a method for carrier sensing implemented at a terminal device according to some embodiments of the present disclosure.

The non-limiting and exemplary embodiments of the present disclosure relate to carrier sensing. FIG. 7 shows a flowchart illustrating a method 700 for carrier sensing implemented at a terminal device according to some embodiments of the present disclosure. The terminal device may be any type of device capable of wireless communication, and it may also be referred to as UE or terminal.

As described above, when the UE wants to transmit data to a network device on a channel which operates in an unlicensed spectrum, the UE needs to perform the carrier sensing on the channel to determine whether the channel is idle or busy. The UE can transmit the data on the channel only if the channel is idle. The unlicensed spectrum may be 5 GHz frequency band or 60 GHz frequency band. However, the timing for the UL data transmission in the NR system is very tight, and thus it might be impossible for the UE to perform the LBT scheme after receiving and decoding downlink scheduling information for uplink data transmission. The downlink scheduling information may be downlink control information (DCI) such as UL grant. To this end, it is proposed that the UE performs the LBT scheme in advance before receiving and decoding the downlink scheduling information.

As shown in FIG. 7, at block 710, the UE may determine at least one transmission resource which is schedulable for UL data transmission. In some embodiments of the present disclosure, the transmission resource may be a time and/or frequency resource, e.g. transmission slot, transmission subband, etc. and will be scheduled by the network device. The UE may assume that it will start the UL data transmission according to the determined transmission resource. Therefore, the transmission resource may be also considered as the possible transmission resource predicted for the UL data transmission.

In some embodiments, the UE may determine the transmission resource at any time. Alternatively, the UE may determine the transmission resource based on a buffer status. If the buffer status indicates that there is buffered data for the UL data transmission, the UE may report it to the network device and the network device may schedule the UL data transmission. In this way, the UE may determine the possible transmission resource for the UL data transmission effectively.

Figure 8:
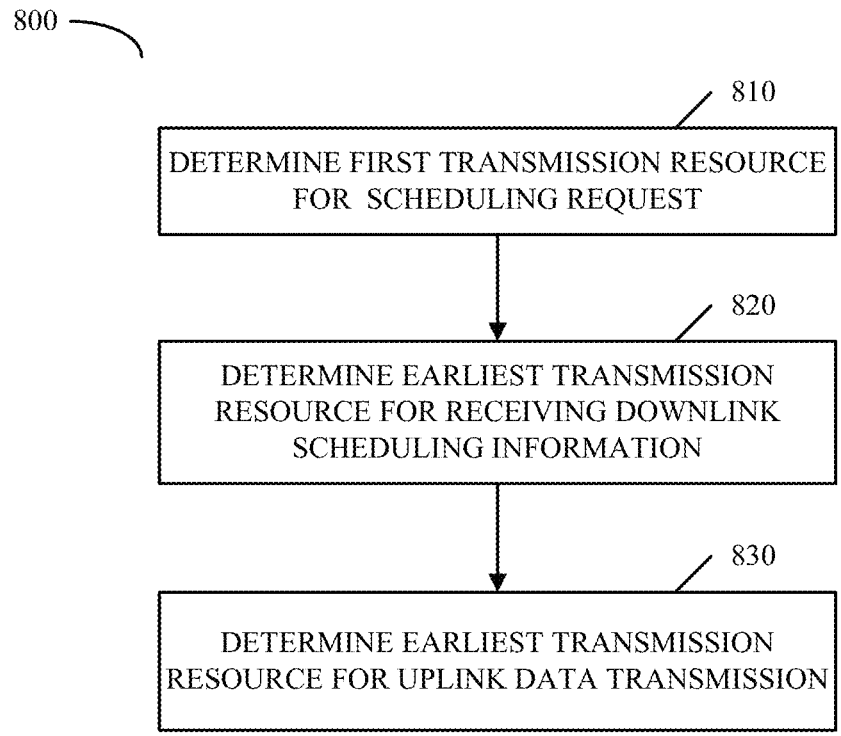
FIG. 8 is a flowchart illustrating an exemplary procedure for determining the transmission resource according to some embodiments of the present disclosure.

FIG. 8 shows a flow chart illustrating an exemplary procedure 800 for determining the transmission resource. In this exemplary procedure, the transmission resource may be determined with respect to scheduling request (SR) transmission. As shown in FIG. 8, at block 810, the UE may determine a first transmission resource for the SR, e.g. the transmission slot for transmitting the SR. Generally, the transmission slot may be pre-configured by the network device or predefined in the UE. Then at block 820, the UE may determine an earliest transmission resource for receiving the UL grant relative to the first transmission resource. In the case that the transmission resource is the transmission slot, the UE may determine the earliest transmission slot according to the transmission slot for transmitting the SR and an interval between the SR transmission and the UL grant receiving. Usually the interval between the SR transmission and the UL grant receiving can be pre-configured by the network device or predefined in the UE. Thereafter at block 830, the UE may determine an earliest transmission resource for the UL data transmission relative to the earliest transmission resource for receiving the UL grant. As known, there is a delay between the UL grant receiving and the UL data transmission and such the delay may be pre-configured. So the UE may determine the earliest transmission slot according to the earliest transmission slot for receiving the UL grant and the delay. For example, if the interval between the SR transmission and the UL grant receiving is one slot, and the delay between the UL grant receiving and the UL data transmission is one slot. Then the UE may determine the earliest transmission slot for the UL data transmission is two slots later with respect to the SR transmission.

Alternatively, in some embodiments, the UE may determine the transmission resource schedulable for the UL data transmission with respect to an end of the last UL data transmission. In this case, the UE may determine a delay duration between two UL data transmission. According to the LBT scheme, the delay duration between two UL data transmission may at least include a defer duration (e.g. DIFS) and a backoff window size. Then the UE may determine the earliest transmission resource schedulable for the UL data transmission according to the end of the last UL data transmission and the delay duration.

Alternatively, in some embodiments, the UE may determine the transmission resource schedulable for the UL data transmission based on Maximum Channel Occupying Time (MCOT).

In some cases, the network device might delay responding to the SR request from the UE due to high traffic load. Thus, the UE might not receive the UL grant when it finishes performing the carrier sensing. To avoid this, in some embodiments, the UE may determine two or more transmission resources schedulable for the UL data transmission. In this case, the earliest transmission resource may be determined as mentioned above, and then the other transmission resource(s) may be determined following the earliest transmission resource.

Back to FIG. 7, after determining one or more transmission resources schedulable for the UL data transmission, at block 720, the UE may determine a carrier sensing process for each transmission resource. In the embodiments of the present disclosure, the carrier sensing process may define, for a certain transmission resource, a backoff value and a start time for performing the carrier sensing. In the embodiments, the backoff value may refer to the backoff window size or contention window size as described above. The backoff value is randomly generated and dependent on the LBT scheme used by the UE. In the embodiments of the present disclosure, the UE may be configured with the category-4 LBT scheme and/or the short LBT scheme. As described above, the short LBT scheme is a kind of LBT scheme in which the backoff window size is 25 μs. In the case of the category-4 LBT scheme, the backoff value complies with Table 2 as describe above. In the case of the short LBT scheme, the backoff value is 25 μs. For each transmission resource, when the backoff value is generated the start time for performing the carrier sensing may be determined. For example, the start time may be determined as the time before the transmission slot for the UL data transmission by the generated backoff value. Alternatively, the start time may be determined as the time before the transmission slot for the UL data transmission by a sum of the generated backoff value and transmission duration of the UL grant.

Then at block 730, the UE may perform the carrier sensing on the channel according to the determined carrier sensing process(es) before receiving the UL grant. In the case of only one carrier sensing process, the UE may start to perform the carrier sensing at the start time of the carrier sensing process. At this time, the UE has transmitted the SR but has not received the UL grant. If the UE receives the UL grant during the carrier sensing and the channel is sensed to be available (i.e. idle), the UE may transmit the UL data on the channel. If the UE does not receive the UL grant during the carrier sensing or the channel is sensed to be unavailable (i.e. busy), the UE cannot transmit the UL data after completion of the carrier sensing.

Figure 9:
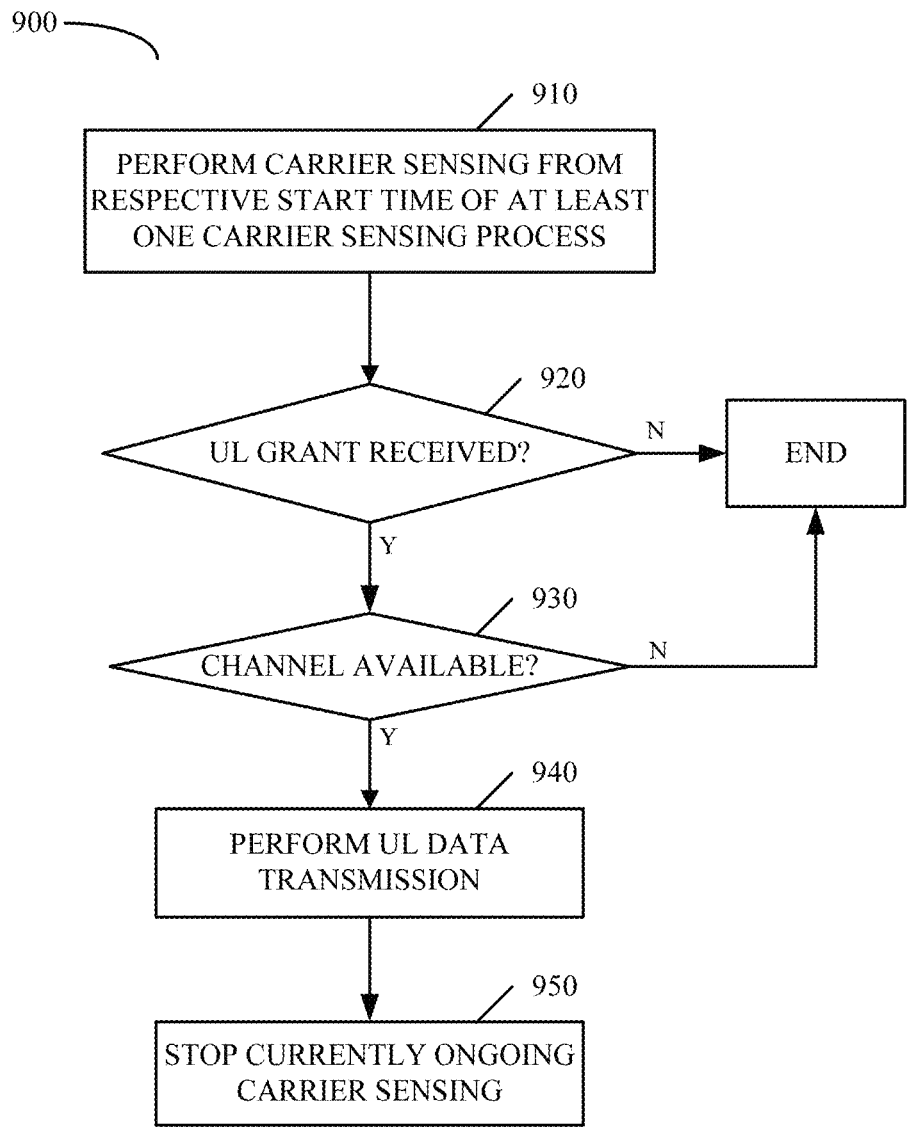
FIG. 9 is a flowchart illustrating an exemplary procedure for performing the carrier sensing according to some embodiments of the present disclosure.

FIG. 9 shows a flowchart illustrating an exemplary procedure 900 of performing the carrier sensing in the case of multiple carrier sensing processes. The multiple carrier sensing processes may be separated from each other or may be overlapped. As shown in FIG. 9, at block 910, the UE may perform the carrier sensing from the respective start times of the carrier sensing processes. Before the UE starts to transmit the UL data on the channel, the UE may continuously perform the carrier sensing according to the determined carrier sensing processes. Then at block 920, the UE may detect whether the UL grant is received. If the UE receives the UL grant ("Y" of block 920), at block 940, the UE may start to transmit the UL data if the channel is sensed to be available ("Y" of block 930). Then the UE may stop the currently ongoing carrier sensing at block 950. If the UE receives the UL grant and the channel is sensed to be unavailable ("N" of block 930), the UE cannot transmit the UL data and the procedure ends. If the UE does not receive the UL grant ("N" of block 920), the procedure also ends.

Figure 10:
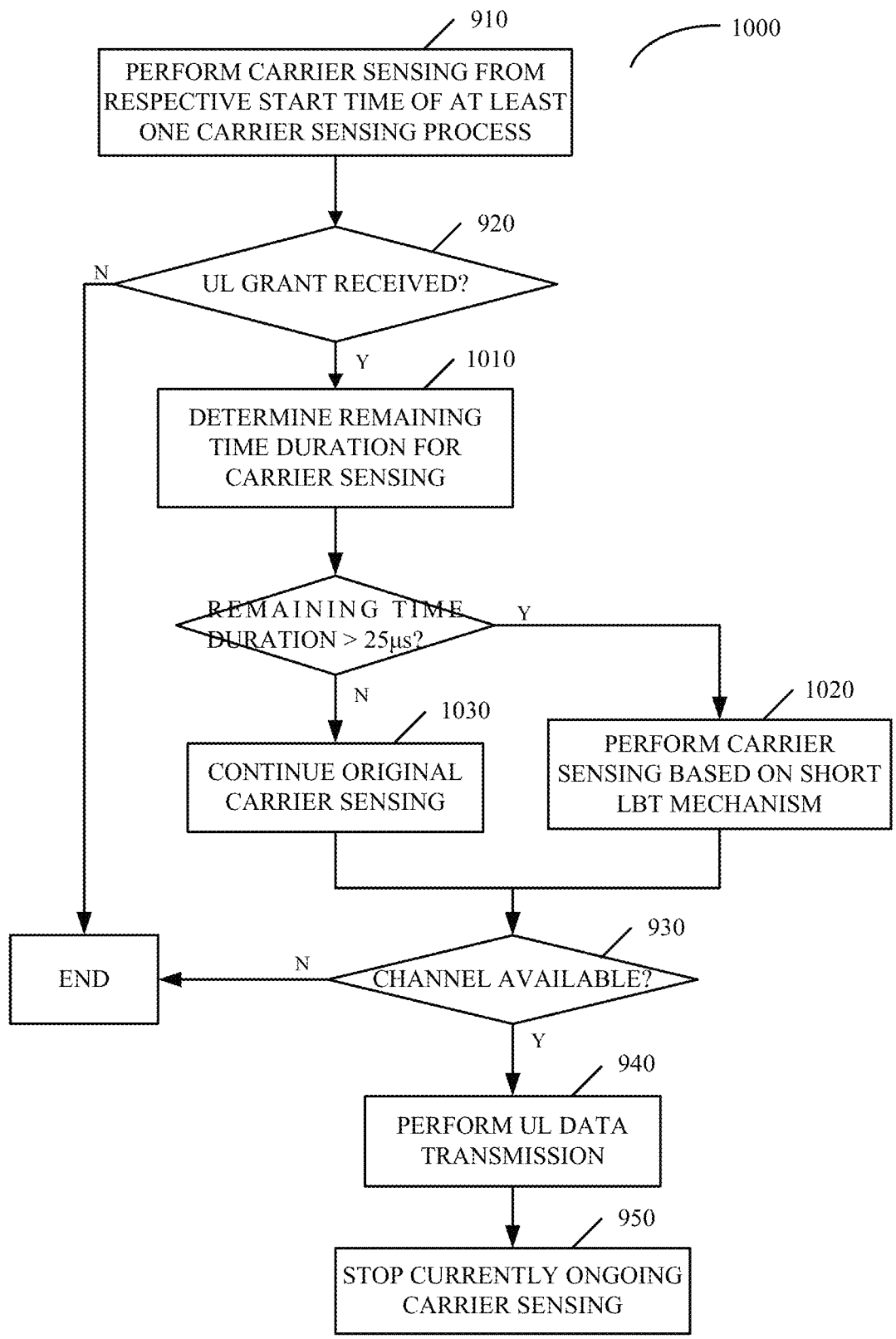
FIG. 10 is a flowchart illustrating another exemplary procedure for performing the carrier sensing according to some embodiments of the present disclosure.

FIG. 10 shows another exemplary procedure 1000 for performing the carrier sensing. In this exemplary procedure, in addition to the steps as shown in FIG. 9, the short LBT scheme may be selected to replace the category-4 LBT scheme under some condition. That is, the UE is configured with both the category-4 LBT scheme and the short LBT scheme. In this case, the category-4 LBT scheme is usually set as the default LBT scheme.

As shown in FIG. 10, if the UE receives the UL grant, the UE may determine, at block 1010, remaining time duration for the carrier sensing. If the remaining time duration is longer than the backoff window size for the short LBT scheme, i.e. 25 μs, at block 1020, the UE may perform the carrier sensing based on the short LBT scheme to replace the carrier sensing based on the category-4 LBT scheme. If the remaining time duration is shorter than 25 μs, at block 1030, the UE may continue the carrier sensing based on the category-4 LBT scheme.

It can be therefore seen that, with the method for carrier sensing as described above, the UE can start the carrier sensing on the channel before receiving and decoding the downlink scheduling information, thereby improving the UE's capability to perform carrier sensing. The UE can get the channel as early as possible.

Figure 11:
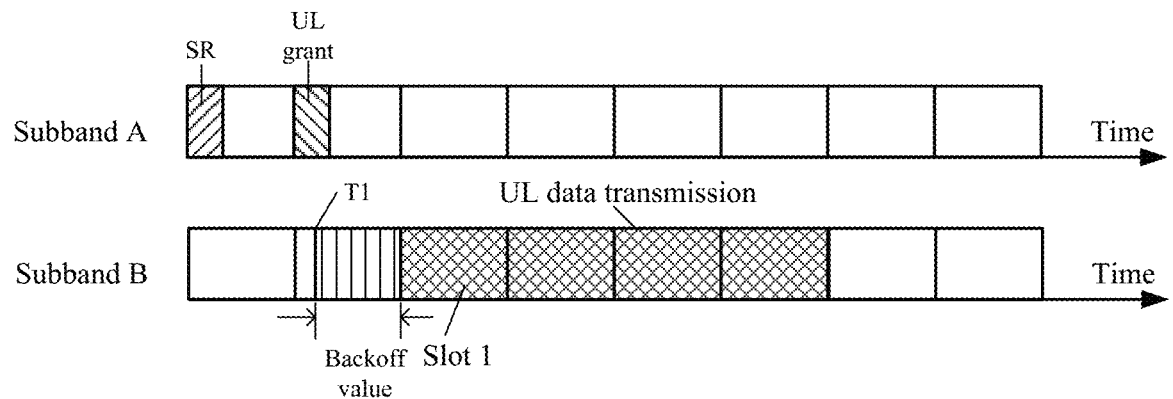
FIG. 11 is a diagram illustrating an example in which the method for carrier sensing of the embodiments of the present disclosure is implemented.

FIG. 11 shows an example in which the method for carrier sensing of the embodiments of the present disclosure is implemented. In this example, the UE determines one transmission resource, Slot 1, schedulable for the UL data transmission and one carrier sensing process (indicating the start time T1 and the backoff value). As shown in FIG. 11, the UE transmits the SR and receives the UL grant in Subband A. The UE starts the carrier sensing in Subband B at time T1 during the transmission duration of the UL grant. If the channel in Subband B is sensed to be available, the UE will start the UL data transmission from Slot 1.

Figure 12:
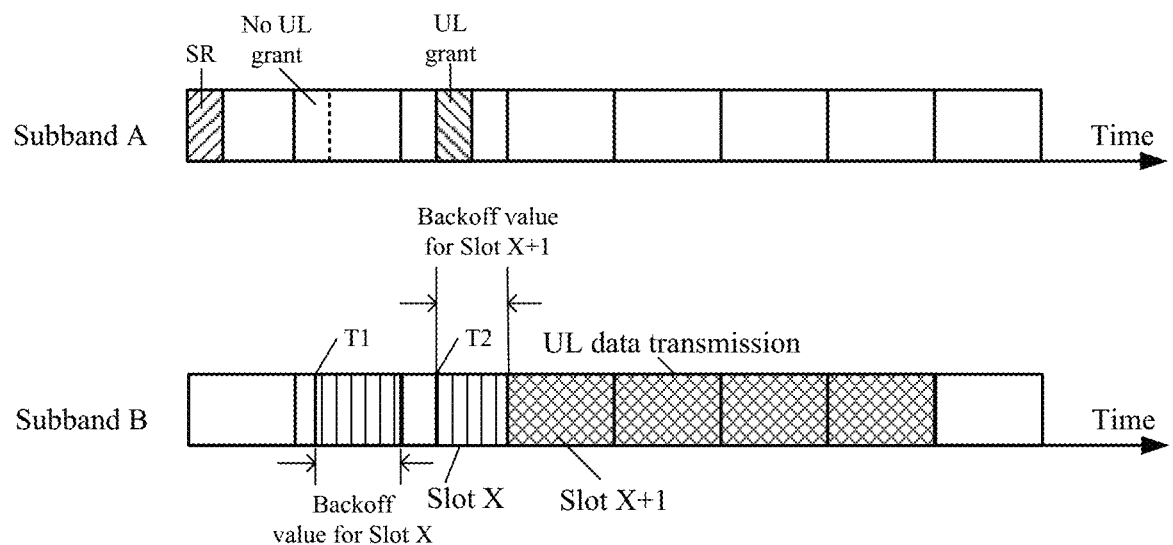
FIG. 12 is a diagram illustrating another example in which the method for carrier sensing of the embodiments of the present disclosure is implemented.

FIG. 12 shows another example in which the method for carrier sensing of the embodiments of the present disclosure is implemented. In this example, the UE determines two transmission resources, Slot X, Slot X+1, schedulable for the UL data transmission, and two carrier sensing processes, Process 1, Process 2, respectively for Slot X and Slot X+1. The UE may transmit the SR and receive the UL grant in Subband A. The UE starts the first carrier sensing according to Process 1 on the channel in Subband B at time T1. The UE does not receive the UL grant during the first carrier sensing. Then the UE starts the second carrier sensing according to Process 2 at time T2. During the second carrier sensing, the UE receives the UL grant, and starts the UL data transmission from Slot X+1 if the channel is sensed to be available.

Figure 13:
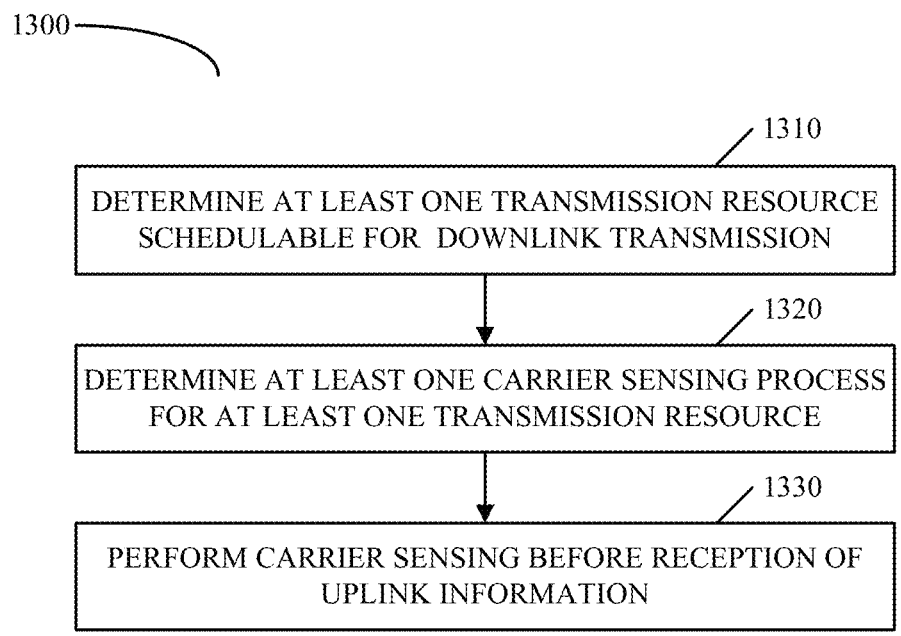
FIG. 13 is a flowchart illustrating a method for carrier sensing implemented at a network device according to some embodiments of the present disclosure.

Under the same inventive concept, FIG. 13 shows a flow chart illustrating a method 1300 for carrier sensing implemented at a network device according to some embodiments of the present disclosure. The network device may be, for example, an eNB operating in the LTE system or a gNB operating in the NR system.

As shown in FIG. 13, at block 1310, the network device may determine one or more transmission resources schedulable for downlink (DL) transmission on the channel operating in the unlicensed spectrum. As described above, the unlicensed spectrum may be 5 GHz frequency band or 60 GHz frequency band. The network device may transmit the data in response to receiving uplink information requiring the downlink transmission. For example, the uplink information may be a SR. In response to receiving the SR, the network device may transmit the UL grant. The uplink information may also be uplink control information for downlink data retransmission, e.g. HARQ (Hybrid Automatic Repeat reQuest) NACK. In response to receiving the HARQ NACK, the network device may retransmit the data.

In some embodiments, the network device may determine the transmission resource schedulable for the DL transmission relative to a transmission resource for SR. As described above, the transmission slot for transmitting the SR by the UE may be pre-configured by the network device. Therefore, the network device may determine the earliest transmission slot for receiving the SR relative to the transmission slot for transmitting the SR, and then determine the earliest transmission slot for transmitting the UL grant relative to the transmission slot for receiving the SR.

Alternatively, in some embodiments, the network device may determine the transmission resource schedulable for the DL transmission relative to a transmission resource for the uplink control information for downlink data retransmission, e.g. the HARQ NACK. Firstly, the network device may determine a transmission resource, e.g. transmission slot, for receiving the HARQ NACK. Generally, the transmission slot for receiving the HARQ NACK may be predefined in the network device. Then, the network device may determine an earliest transmission resource for the DL data retransmission. As known, there is a delay between the HARQ NACK receiving and the DL data retransmission and such the delay may be predefined. So the network device may determine the earliest transmission resource according to the transmission slot for receiving the HARQ NACK and the delay.

Then at block 1320, the network device may determine one or more carrier sensing processes respectively for the determined one or more transmission resource schedulable for the DL transmission. Each carrier sensing process may define the backoff value and the start time for starting the carrier sensing. The backoff value and the start time may be determined as described above.

At block 1330, the network device may perform the carrier sensing on the channel according to the determined one or more carrier sensing processes. In the case of only one carrier sensing process, the network device may start to perform the carrier sensing at the start time of the carrier sensing process. At this time, the network device has not received uplink information such as the SR or HARQ NACK from the UE. If the network device receives the SR or HARQ NACK during the carrier sensing and the channel is sensed to be available, the network device may transmit the UL grant or the data on the channel. If the network device does not receive the SR or HARQ NACK during the carrier sensing or the channel is sensed to be unavailable, the network device cannot transmit the UL grant or the data after completion of the carrier sensing.

Figure 14:
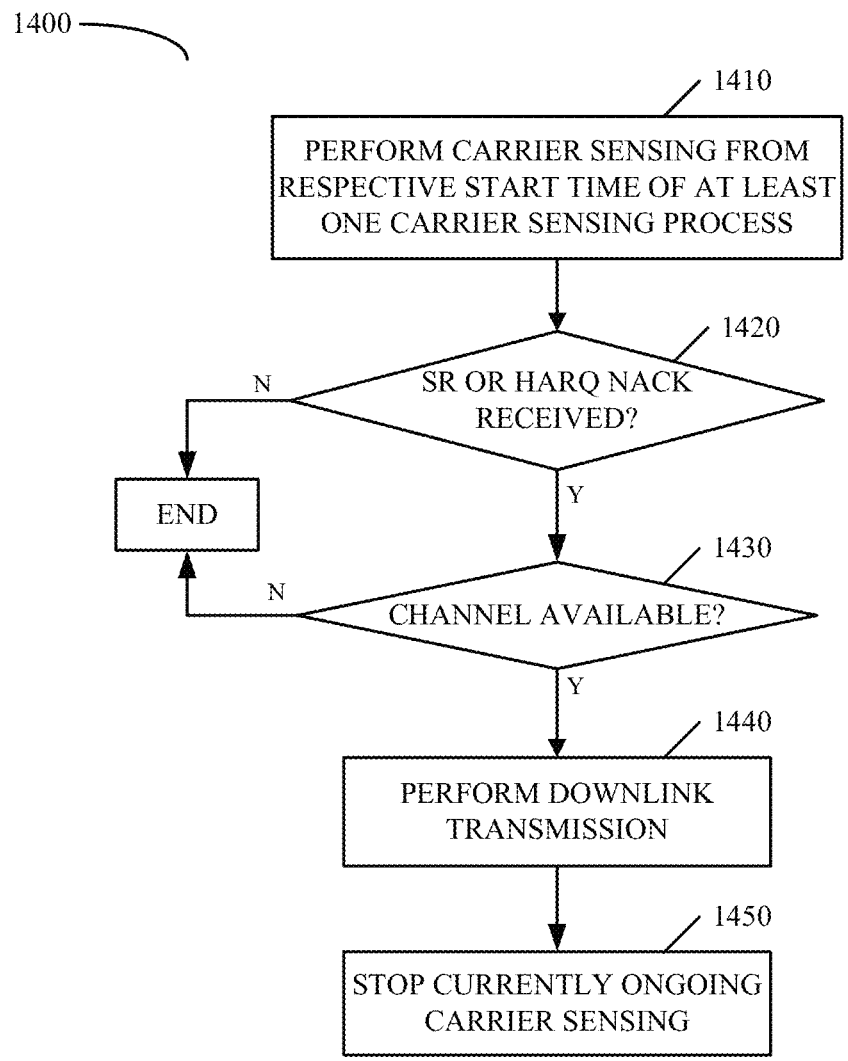
FIG. 14 is a flowchart illustrating an exemplary procedure for performing the carrier sensing according to some embodiments of the present disclosure.

FIG. 14 shows an exemplary procedure 1400 for performing the carrier sensing in the case of multiple carrier sensing processes. The multiple carrier sensing processes may be separated from each other or may be overlapped. As shown in FIG. 14, at block 1410, the network device may perform the carrier sensing from the respective start times of the carrier sensing processes. Before the network device starts to transmit the UL grant or retransmit the data on the channel, the network device may continuously perform the carrier sensing according to the determined carrier sensing processes. Then at block 1420, the network device may detect whether the SR or HARQ NACK is received. If the network device receives the SR or HARQ NACK ("Y" of block 1420), at block 1440, the network device may start to transmit the UL grant or retransmit the data if the channel is sensed to be available ("Y" of block 1430). Then the network device may stop the currently ongoing carrier sensing at block 1450. If the network device receives the SR or HARQ NACK and the channel is sensed to be unavailable ("N" of block 1430), the network cannot transmit the UL grant or retransmit the data and the procedure ends. If the network device does not receive the SR or HARQ NACK ("N" of block 1420), the procedure also ends.

Figure 15:
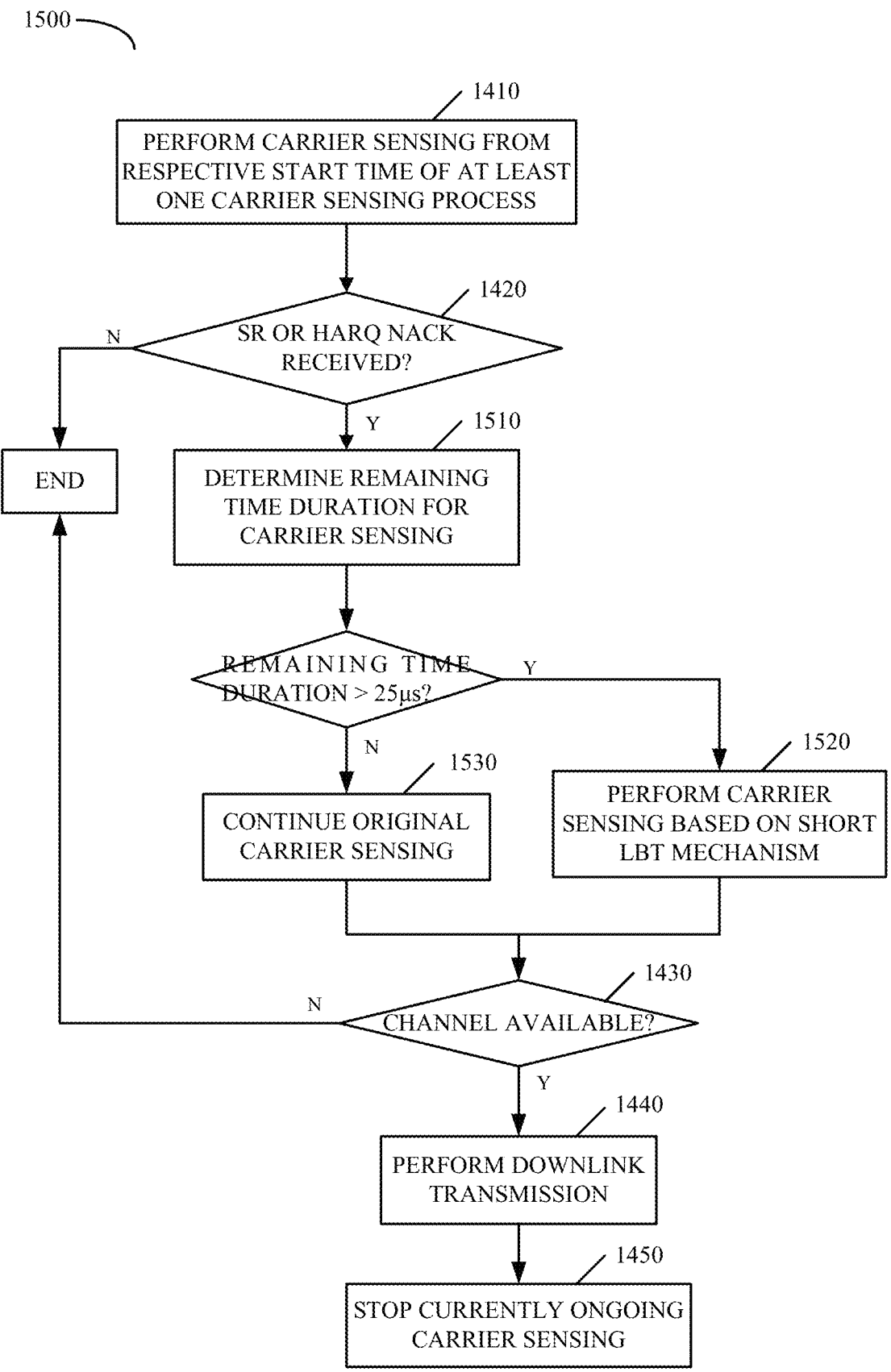
FIG. 15 is a flowchart illustrating another exemplary procedure for performing the carrier sensing according to some embodiments of the present disclosure.

FIG. 15 shows another exemplary procedure 1500 for performing the carrier sensing. In this exemplary procedure, in addition to the steps as shown in FIG. 14, the short LBT scheme may be selected to replace the category-4 LBT scheme under some condition. As described above, the network device may support both the category-4 LBT scheme and the short LBT scheme. In this case, the category-4 LBT scheme is usually set as the default LBT scheme.

As shown in FIG. 15, if the network device receives the SR or HARQ NACK during the carrier sensing based on the category-4 LBT scheme, the network device may determine, at block 1510, remaining time duration for the carrier sensing. If the remaining time duration is longer than the backoff window size for the short LBT scheme, i.e. 25 μs, at block 1520, the network device may perform the carrier sensing based on the short LBT scheme to replace the carrier sensing based on the category-4 LBT scheme. If the remaining time duration is shorter than 25 μs, at block 1530, the network device may continue the carrier sensing based on the category-4 LBT scheme.

Figure 16:
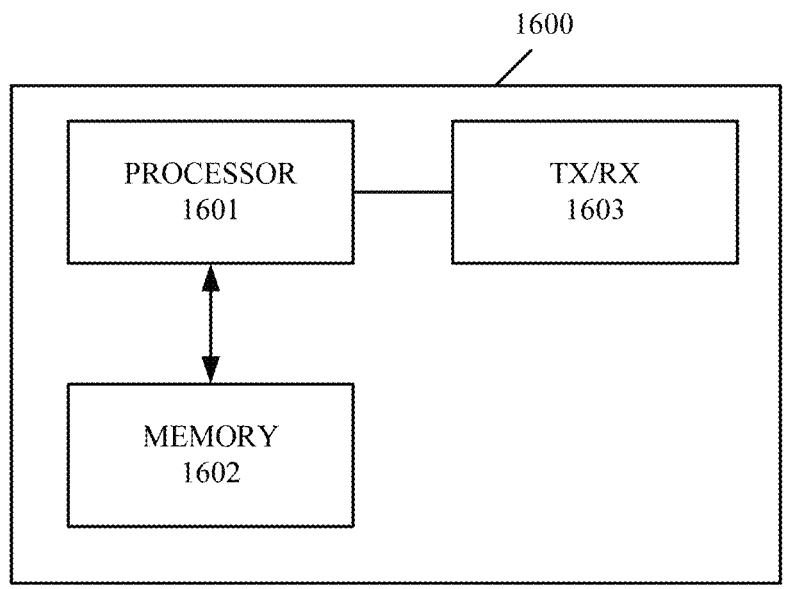
FIG. 16 is a schematic block diagram of an apparatus in a terminal device according to some embodiments of the present disclosure.

FIG. 16 shows a schematic block diagram of an apparatus 1600 that may be embodied in/as a terminal device according to some embodiments of the present disclosure. As shown in FIG. 16, the apparatus 1600 may comprise a processor 1601 and a memory 1602. The apparatus 1600 may further comprise a transmitter TX and receiver RX 1603 coupled to the processor 1601. The memory 1602 may contain instructions executable by the processor 1601. The apparatus 1600 is operative to determine at least one transmission resource schedulable for uplink data transmission on a channel operating in an unlicensed spectrum, to determine at least one carrier sensing process respectively for the at least one transmission resource, and to perform the carrier sensing on the channel according to the determined at least one carrier sensing process before reception of downlink scheduling information for the uplink data transmission.

The processor 1601 may be of any type suitable to the local technical environment, and may comprise one or more of general purpose computers, special purpose computers, microprocessors, digital signal processors (DSPs) and processors based on multi-core processor architectures, as non-limiting examples. The memory 1602 may be of any type suitable to the local technical environment and may be implemented using any suitable data storage technology, such as semiconductor based memory devices, flash memory, magnetic memory devices and systems, optical memory devices and systems, fixed memory and removable memory. The memory 1602 may be a non-transitory machine/processor/computer readable storage medium.

In some embodiments, the apparatus 1600 is further operative to determine the at least one transmission resource based on a buffer status indicating there is buffered data for the uplink data transmission.

In some embodiments, the apparatus 1600 is further operative to determine a first transmission slot for scheduling request, to determine an earliest transmission resource for receiving the downlink scheduling information relative to the first transmission resource, to determine an earliest transmission resource for the uplink data transmission relative to the earliest transmission resource for receiving the downlink scheduling information.

In some embodiments, the apparatus 1600 is further operative to determine the at least one transmission resource with respect to an end of last uplink data transmission.

In some embodiments, the apparatus 1600 is further operative to determine a delay duration between different uplink data transmissions, to determine an earliest transmission resource for the uplink data transmission based on the end of the last uplink data transmission and the delay duration.

In some embodiments, the apparatus 1600 is further operative to determine the at least one transmission resource based on a maximum channel occupying time.

In some embodiments, the apparatus 1600 is further operative to generate, for the at least one carrier sensing process, a respective backoff value, and to determine a start time of the at least one carrier process based on the corresponding transmission resource and the backoff value.

In some embodiments, the apparatus 1600 is further operative to perform the carrier sensing on the channel from the respective start time of the at least one carrier sensing process, to detect the reception of the downlink scheduling information, to perform, in response to the channel being sensed to be available, the uplink data transmission and to stop the currently ongoing carrier sensing.

In some embodiments, the apparatus 1600 is further operative to determine, upon the reception of the downlink scheduling information, remaining time duration for the carrier sensing, and to perform, in response to the remaining time duration being longer than a backoff value for a short listen before talk scheme, the carrier sensing based on the short listen before talk.

Figure 17:
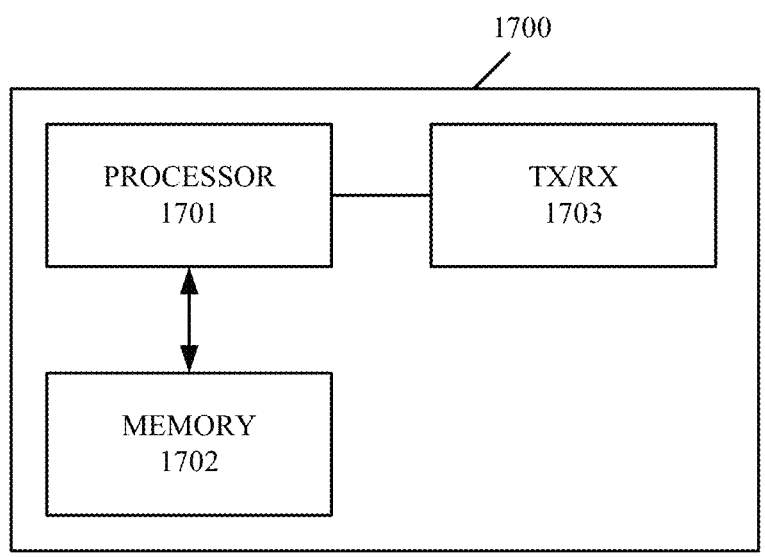
FIG. 17 is a schematic block diagram of an apparatus in a network device according to some embodiments of the present disclosure.

FIG. 17 is a schematic block diagram of an apparatus 1700 that may be embodied in/as a network device according to some embodiments of the present disclosure. As shown in FIG. 17, the apparatus 1700 may comprise a processor 1701 and a memory 1702. The apparatus 1700 may further comprise a suitable transmitter TX and receiver RX 1703 coupled to the processor 1701. The memory 1702 may contain instructions executable by the processor 1701. The apparatus 1700 is operative to determine at least one transmission resource schedulable for downlink transmission on a channel operating in an unlicensed spectrum, to determine at least one carrier sensing process respectively for the at least one transmission resource, and to perform the carrier sensing on the channel according to the determined at least one carrier sensing process before reception of uplink information requiring the downlink transmission.

The processor 1701 may be of any type suitable to the local technical environment, and may comprise one or more of general purpose computers, special purpose computers, microprocessors, digital signal processors (DSPs) and processors based on multi-core processor architectures, as non-limiting examples. The memory 1702 may be of any type suitable to the local technical environment and may be implemented using any suitable data storage technology, such as semiconductor based memory devices, flash memory, magnetic memory devices and systems, optical memory devices and systems, fixed memory and removable memory. The memory 1702 may be a non-transitory machine/processor/computer readable storage medium.

In some embodiments, the apparatus 1700 is further operative to determine the at least one transmission resource relative to a transmission resource for scheduling request.

In some embodiments, the apparatus 1700 is further operative to determine the at least one transmission resource relative to a transmission resource for uplink control information for downlink data retransmission.

In some embodiments, the apparatus 1700 is further operative to generate, for the at least one carrier sensing process, a respective backoff value, and to determine a start time of the at least one carrier process based on the corresponding transmission resource and the backoff value.

In some embodiments, the apparatus 1700 is further operative to perform the carrier sensing on the channel from the respective start time of the at least one carrier sensing process, to detect the reception of the uplink information requiring the downlink transmission, to perform, in response to the channel being sensed to be available, the downlink transmission, and to stop the currently ongoing carrier sensing.

In some embodiments, the apparatus 1700 is further operative to determine, upon the receipt of the uplink information requiring the downlink transmission, remaining time duration for the carrier sensing, and to perform, in response to the remaining time duration being longer than a backoff value for a short listen before talk scheme, the carrier sensing based on the short listen before talk scheme.

Figure 18:
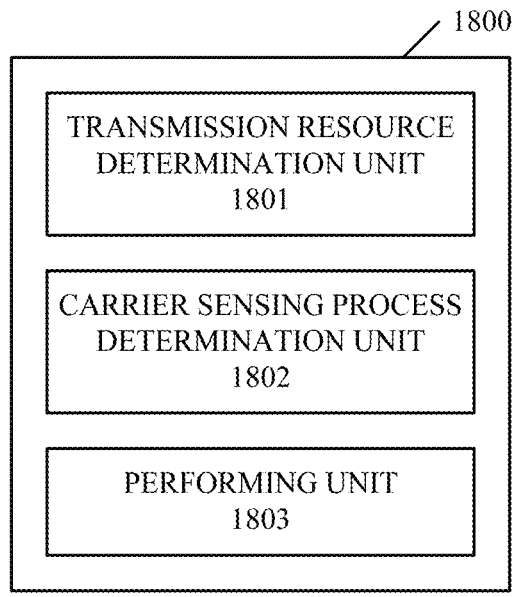
FIG. 18 is a schematic block diagram of an apparatus in a terminal device according to some embodiments of the present disclosure.

FIG. 18 is a schematic block diagram of an apparatus 1800 in a terminal device according to some embodiments of the present disclosure. As shown in FIG. 18, the apparatus 1800 may comprise a transmission resource determination unit 1801 configured to determine at least one transmission resource schedulable for uplink data transmission on a channel operating in an unlicensed spectrum, a carrier sensing process determination unit 1802 configured to determine at least one carrier sensing process respectively for the at least one transmission resource, and a performing unit 1803 configured to perform the carrier sensing on the channel according to the determined at least one carrier sensing process before reception of downlink scheduling information for the uplink data transmission.

In some embodiments, the transmission resource determination unit 1801 is further configured to determine the at least one transmission resource based on a buffer status indicating there is buffered data for the uplink data transmission.

In an embodiment, the transmission resource determination unit 1801 may comprise a first resource determination unit configured to determine a first transmission resource for scheduling request, a second resource determination unit configured to determine an earliest transmission resource for receiving the downlink scheduling information relative to the first transmission resource, and a third resource determination unit configured to determine an earliest transmission resource for the uplink data transmission relative to the earliest transmission resource for receiving the downlink scheduling information.

In some embodiments, the transmission resource determination unit 1802 is further configured to determine the at least one transmission resource with respect to an end of last uplink data transmission.

In some embodiments, the transmission resource determination unit 1801 may comprise a delay determination unit configured to determine a delay duration between different uplink data transmissions, and a resource determination unit configured to determine an earliest transmission resource for the uplink data transmission based on the end of the last uplink data transmission and the delay duration.

In some embodiments, the transmission resource determination unit 1801 is further configured to determine the at least one transmission resource based on a maximum channel occupying time.

In some embodiments, the carrier sensing process determination unit 1802 may comprise a generation unit configured to generate, for the at least one carrier sensing process, a respective backoff value, and a start time determination unit configured to determine a start time of the at least one carrier sensing process based on the corresponding transmission resource and the backoff value.

In some embodiments, the performing unit 1803 may comprise a first performing unit configured to perform the carrier sensing on the channel from the respective start time of the at least one carrier sensing process, a detection unit configured to detect the reception of the downlink scheduling information, a second performing unit configured to perform, in response to the channel being sensed to be available, the uplink data transmission, and a stopping unit configured to stop the currently ongoing carrier sensing.

In some embodiments, the performing unit 1803 may further comprise a remaining time duration determination unit configured to determine, upon the reception of the downlink scheduling information, remaining time duration for the carrier sensing, and a third performing unit configured to perform, in response to the remaining time duration being longer than a backoff value for a short listen before talk scheme, the carrier sensing based on the short listen before talk.

Figure 19:
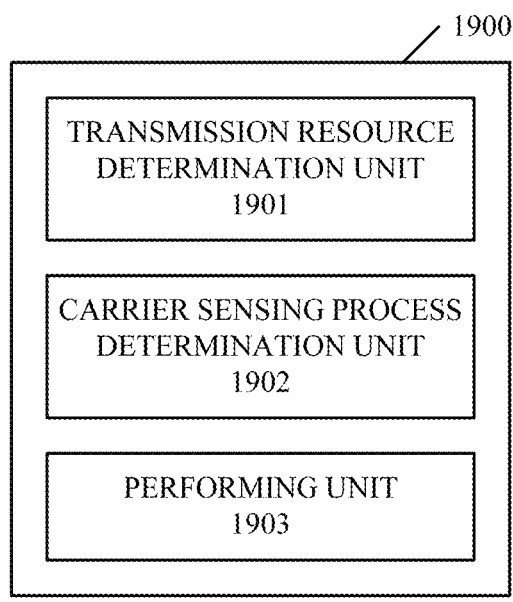
FIG. 19 is a schematic block diagram of an apparatus in a network device according to some embodiments of the present disclosure.

FIG. 19 is a schematic block diagram of an apparatus 1900 in a network device according to some embodiments of the present disclosure. As shown in FIG. 19, the apparatus 1900 may comprise a transmission resource determination unit 1901 configured to determine at least one transmission resource schedulable for downlink transmission on a channel operating in an unlicensed spectrum, a carrier sensing process determination unit 1902 configured to determine at least one carrier sensing process respectively for the at least one transmission resource, and a performing unit 1903 operable to perform the carrier sensing on the channel according to the determined at least one carrier sensing process before reception of uplink information requiring downlink transmission.

In some embodiments, the transmission resource determination unit 1901 is further configured to determine the at least one transmission resource relative to a transmission resource for scheduling request.

In some embodiments, the transmission resource determination unit 1901 is further configured to determine the at least one transmission resource relative to a transmission resource for uplink control information for downlink data retransmission.

In some embodiments, the carrier sensing process determination unit 1902 may comprise a generation unit configured to generate, for the at least one carrier sensing process, a respective backoff value, and a start time determination unit configured to determine a start time of the at least one carrier sensing process based on the corresponding transmission resource and the backoff value.

In some embodiments, the performing unit 1903 may comprise a first performing unit configured to perform the carrier sensing on the channel from the respective start time of the at least one carrier sensing process, a detection unit configured to detect the reception of the uplink information requiring the downlink transmission, a second performing unit configured to perform, in response to the channel being sensed to be available, the downlink transmission, and a stopping unit configured to stop the currently ongoing carrier sensing.

In some embodiments, the performing unit 1903 may further comprise a remaining time duration determination unit configured to determine, upon the reception of the uplink information, remaining time duration for the carrier sensing, and a third performing unit configured to perform, in response to the remaining time duration being longer than a backoff value for a short listen before talk scheme, the carrier sensing based on the short listen before talk.

It should be noted that FIGS. 18, 19 merely illustrate various functional modules in the apparatuses 1800 and 1900, and a person skilled in the art can implement these functional modules in practice using any suitable software and hardware. Thus the embodiments herein are generally not limited to the shown structure of the apparatuses 1800, 1900 and functional modules.

In some embodiments of the present disclosure, there is also provided a computer readable storage medium having a computer program stored thereon. The computer program is executable by a device to cause the device to carry out the above method for carrier sensing implemented at the terminal device.

In some embodiments of the present disclosure, there is also provided a computer program product executable by a device to cause the device to carry out the method for carrier sensing implemented at the network device.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure comprises any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method for carrier sensing implemented at a terminal device comprising:
   determining at least one transmission resource schedulable for uplink data transmission on a channel operating in an unlicensed spectrum;
   determining at least one carrier sensing process respectively for the at least one transmission resource; and
   performing the carrier sensing on the channel according to the determined at least one carrier sensing process, before reception of downlink scheduling information for the uplink data transmission.

2. The method according to claim 1 wherein the at least one transmission resource is determined based on a buffer status indicating there is buffered data for the uplink data transmission.

3. The method according to claim 1, wherein determining the at least one transmission resource comprises:
   determining a first transmission resource for scheduling request;
   determining an earliest transmission resource for receiving the downlink scheduling information relative to the first transmission resource; and
   determining an earliest transmission resource for the uplink data transmission relative to the earliest transmission resource for receiving the downlink scheduling information.

4. The method according to claim 1, wherein the at least one transmission resource is determined with respect to an end of the last uplink data transmission.

5. The method according to claim 4 wherein determining the at least one transmission resource comprises:
   determining a delay duration between different uplink data transmissions; and
   determining an earliest transmission resource for the uplink data transmission based on the end of the last uplink data transmission and the delay duration.

6. The method according to claim 1, wherein the at least one transmission resource is determined based on a maximum channel occupying time.

7. The method according to claim 1, wherein determining at least one carrier sensing process respectively for the at least one transmission resource comprises:
   generating, for the at least one carrier sensing process, a respective backoff value; and
   determining a start time of the at least one carrier sensing process based on the corresponding transmission resource and the backoff value.

8. The method according to claim 7 wherein performing the carrier sensing on the channel according to the determined at least one carrier sensing process comprises:
   performing the carrier sensing on the channel from the respective start time of the at least one carrier sensing process;
   detecting the reception of the downlink scheduling information;
   performing, in response to the channel being sensed to be available, the uplink data transmission; and
   stopping the currently ongoing carrier sensing.

9. The method according to claim 8 wherein performing the carrier sensing according to the determined at least one carrier sensing process further comprises:
   determining, upon the reception of the downlink scheduling information, remaining time duration for the carrier sensing; and
   performing, in response to the remaining time duration being longer than a backoff value for a short listen before talk scheme, the carrier sensing based on the short listen before talk scheme.

10. The method according to claim 1, wherein the carrier sensing is based on a category-4 listen before talk scheme or a short listen before talk scheme.

11. A terminal device comprising:
    a processor; and
    a memory, said memory containing instructions executable by said processor, whereby said terminal device is operative to:
    determine at least one transmission resource schedulable for uplink data transmission on a channel operating in an unlicensed spectrum;
    determine at least one carrier sensing process respectively for the at least one transmission resource; and
    perform the carrier sensing on the channel according to the determined at least one carrier sensing process, before reception of downlink scheduling information for the uplink data transmission.

12. The terminal device according to claim 11 wherein the terminal device is operative to determine the at least one transmission resource based on a buffer status indicating there is buffered data for the uplink data transmission.

13. The terminal device according to claim 11, wherein the terminal device is operative to determine the at least one transmission resource by:
    determining a first transmission resource for scheduling request;
    determining an earliest transmission resource for receiving the downlink scheduling information relative to the first transmission resource; and
    determining an earliest transmission resource for the uplink data transmission relative to the earliest transmission resource for receiving the downlink scheduling information.

14. The terminal device according to claim 11, wherein the terminal device is operative to determine the at least one transmission resource with respect to an end of last uplink data transmission.

15. The terminal device according to claim 14 wherein the terminal device is operative to determine the at least one transmission resource by:
- determining a delay duration between different uplink data transmissions; and
- determining an earliest transmission resource for the uplink data transmission based on the end of the last uplink data transmission and the delay duration.

* * * * *